United States Patent [19]
Liu

[11] Patent Number: 6,110,248
[45] Date of Patent: Aug. 29, 2000

[54] DUAL FILTER ASSEMBLY FOR A VACUUM CLEANER

[75] Inventor: Li H. Liu, Tucson, Ariz.

[73] Assignee: Shop Vac Corporation, Williamsport, Pa.

[21] Appl. No.: 09/143,980

[22] Filed: Aug. 31, 1998

[51] Int. Cl.$^7$ .................................................. B01D 27/08
[52] U.S. Cl. ........................... 55/490; 55/385.1; 55/472; 55/476; 55/498; 55/506; 55/DIG. 3
[58] Field of Search ................................ 55/385.1, 385.3, 55/472, 476, 487, 490, 498, 510, DIG. 3, 497, 506, 508; 210/232, 450

[56] References Cited

U.S. PATENT DOCUMENTS

| | | |
|---|---|---|
| 1,316,442 | 9/1919 | Goughnour . |
| 1,639,133 | 8/1927 | Greene . |
| 2,475,808 | 7/1949 | Storm, Jr. . |
| 2,663,660 | 12/1953 | Layte . |
| 2,785,767 | 3/1957 | Glidden . |
| 3,186,391 | 6/1965 | Kennedy . |
| 3,290,870 | 12/1966 | Jensen . |
| 3,365,864 | 1/1968 | Iizima . |
| 3,397,793 | 8/1968 | MacDonnell . |
| 3,399,516 | 9/1968 | Hough, Jr. et al. . |
| 3,488,928 | 1/1970 | Tarala . |
| 3,930,281 | 1/1976 | Principe et al. . |
| 4,036,346 | 7/1977 | Livingston . |
| 4,080,104 | 3/1978 | Brown, Jr. . |
| 4,120,711 | 10/1978 | Gudeman . |
| 4,268,289 | 5/1981 | Polaner . |
| 4,304,580 | 12/1981 | Gehl et al. . |
| 4,314,832 | 2/1982 | Fox . |
| 4,508,550 | 4/1985 | Berfield et al. . |
| 4,547,206 | 10/1985 | Sovis et al. . |
| 4,609,387 | 9/1986 | Berfield et al. . |
| 4,619,674 | 10/1986 | Erdmannsdörfer . |
| 4,619,675 | 10/1986 | Watanabe . |
| 4,623,366 | 11/1986 | Berfield et al. . |
| 4,647,373 | 3/1987 | Tokar et al. . |
| 4,654,926 | 4/1987 | McCambridge . |
| 4,704,144 | 11/1987 | LeBlanc et al. . |
| 4,800,612 | 1/1989 | Valentine . |
| 4,800,613 | 1/1989 | Blase et al. . |
| 4,800,615 | 1/1989 | Ostroski et al. . |
| 4,801,376 | 1/1989 | Kulitz . |
| 4,809,396 | 3/1989 | Houser . |
| 4,826,597 | 5/1989 | Silverwater et al. . |
| 4,838,907 | 6/1989 | Perry . |
| 4,861,479 | 8/1989 | Solzer . |
| 4,878,929 | 11/1989 | Tofsland et al. . |
| 4,886,599 | 12/1989 | Bachmann et al. . |
| 4,890,444 | 1/1990 | Vander Giessen et al. . |
| 4,894,881 | 1/1990 | Palmer et al. . |
| 4,906,265 | 3/1990 | Berfield . |
| 4,957,522 | 9/1990 | Brassell . |
| 4,976,850 | 12/1990 | Kulitz . |
| 4,976,858 | 12/1990 | Kadoya . |
| 5,032,155 | 7/1991 | Wiese et al. . |

(List continued on next page.)

FOREIGN PATENT DOCUMENTS

| | | |
|---|---|---|
| 3243506 A1 | 11/1982 | Germany . |
| 8514495 | 5/1985 | Germany . |
| 9017798 | 11/1990 | Germany . |
| 3-176019 | 7/1991 | Japan . |

OTHER PUBLICATIONS

Eurpoean Search for Application No. EP 99 40 2129 dated Feb. 25, 2000.

*Primary Examiner*—David A. Simmons
*Assistant Examiner*—Minh-Chau T. Pham
*Attorney, Agent, or Firm*—Marshall, O'Toole, Gerstein, Murray & Borun

[57] ABSTRACT

A dual filter assembly for a vacuum cleaner includes an annular inner filter mountable on a filter cage of the vacuum cleaner. The inner filter has a lower end and a retaining ring is attached to the lower end. An annular outer filter is removably mounted surrounding the inner filter, with a lower end of the outer filter supported by the retaining ring.

15 Claims, 6 Drawing Sheets

U.S. PATENT DOCUMENTS

| | | |
|---|---|---|
| 5,080,697 | 1/1992 | Finke . |
| 5,185,190 | 2/1993 | Grimes . |
| 5,193,709 | 3/1993 | Brassell . |
| 5,205,014 | 4/1993 | Yoo . |
| 5,248,323 | 9/1993 | Stevenson . |
| 5,259,854 | 11/1993 | Newman . |
| 5,267,371 | 12/1993 | Soler et al. . |
| 5,287,591 | 2/1994 | Rench et al. . |
| 5,343,592 | 9/1994 | Parise . |
| 5,350,515 | 9/1994 | Stark et al. . |
| 5,388,301 | 2/1995 | Bosyj et al. . |
| 5,394,587 | 3/1995 | Parise . |
| 5,455,983 | 10/1995 | Crouser et al. . |
| 5,478,372 | 12/1995 | Stark . |
| 5,545,241 | 8/1996 | Vanderauwera et al. . |
| 5,570,489 | 11/1996 | Lee . |
| 5,593,479 | 1/1997 | Frey et al. . |
| 5,608,945 | 3/1997 | Crouser et al. . |
| 5,669,949 | 9/1997 | Dudrey et al. . |
| 5,672,399 | 9/1997 | Kahlbaugh et al. . |
| 5,733,351 | 3/1998 | Hult et al. . |
| 5,855,634 | 1/1999 | Berfield . |
| 5,871,567 | 2/1999 | Wengton et al. ............... 55/385.3 |

DUAL FILTER ASSEMBLY FOR A VACUUM CLEANER

FIELD OF THE INVENTION

The present invention relates generally to vacuum cleaners, and more particularly to filters for vacuum cleaners.

BACKGROUND OF THE INVENTION

Vacuum cleaners generally include a motor which drives an air impeller to create a low pressure area inside of a tank or other receptacle. The tank has an inlet through which dust and debris or liquid material enter into the tank, usually from a hose. When liquid is being suctioned into the tank, it is not generally necessary to have a filter between the tank and the air impeller. For instance, in U.S. Pat. No. 4,906,265, a foam cuff 30 fits over a filter cage 20 during wet operations. When the vacuum cleaner is used on dry materials, a paper or cloth filter is placed over the foam cuff and attached with a ring. The paper or cloth filter then minimizes the amount of particulate material which escapes from the tank and passes to the air impeller. Dust or debris in the air impeller is undesirable because it may interfere with the operation of the air impeller or motor, and the dust or debris may be exhausted back out into the room.

While cloth or flat paper filters may be satisfactory, it is often desirable to use a cylindrical pleated filter for some types of vacuuming. Cylindrical or cartridge filters have a large filtering surface area and may be made of a variety of filtering materials. It has therefore been known to use a cylindrical filter with an open top and a closed bottom which is inserted over a filter cage. The top of the filter may be made of a flexible material such as rubber so that when the filter is pushed over the filter cage, the flexible material deforms and frictionally holds the filter in place.

Other systems use cylindrical filters which are open at both ends. Such filters may fit over a filter cage having a closed bottom in order to prevent material from passing around the filter and into the air impeller. Other open-ended filters may use a retainer of some type which holds the filter in place and closes the open end of the filter.

Dual filter assemblies may include two types of filter media concentrically arranged in a single filter unit, such as that disclosed in Newman, U.S. Pat. No. 5,259,854. High efficiency particle air ("HEPA") filters, which can remove 99.97% of particles larger than 0.3 microns from a stream of air, are useful for removing very small particles of dust or debris from air. Newman discloses a disposable filter cannister including an annular HEPA filter surrounded by a prefilter. There is a need for a dual filter assembly in which each of the filters can be separately removed for inspection and replacement, and in which one or both filters may be used. There is a also a need for a dual filter assembly that may be used in a vacuum cleaner designed for a single filter, without modifying the filter cage or other parts of the vacuum cleaner.

SUMMARY OF THE INVENTION

In accordance with one aspect of the present invention, a dual filter assembly for a vacuum cleaner includes an annular inner filter mountable on a filter cage of the vacuum cleaner. The inner filter has a lower end and a retaining ring is attached to the lower end. An annular outer filter has a lower end and the outer filter is removably mounted surrounding the inner filter. The lower end of the outer filter is supported by the retaining ring.

Other objects and advantages of the invention will be apparent to those skilled in the art from a review of the following detailed description, taken in conjunction with the drawings and the appended claims.

DETAILED DESCRIPTION OF THE PREFERRED EMBODIMENT

Figure 1:
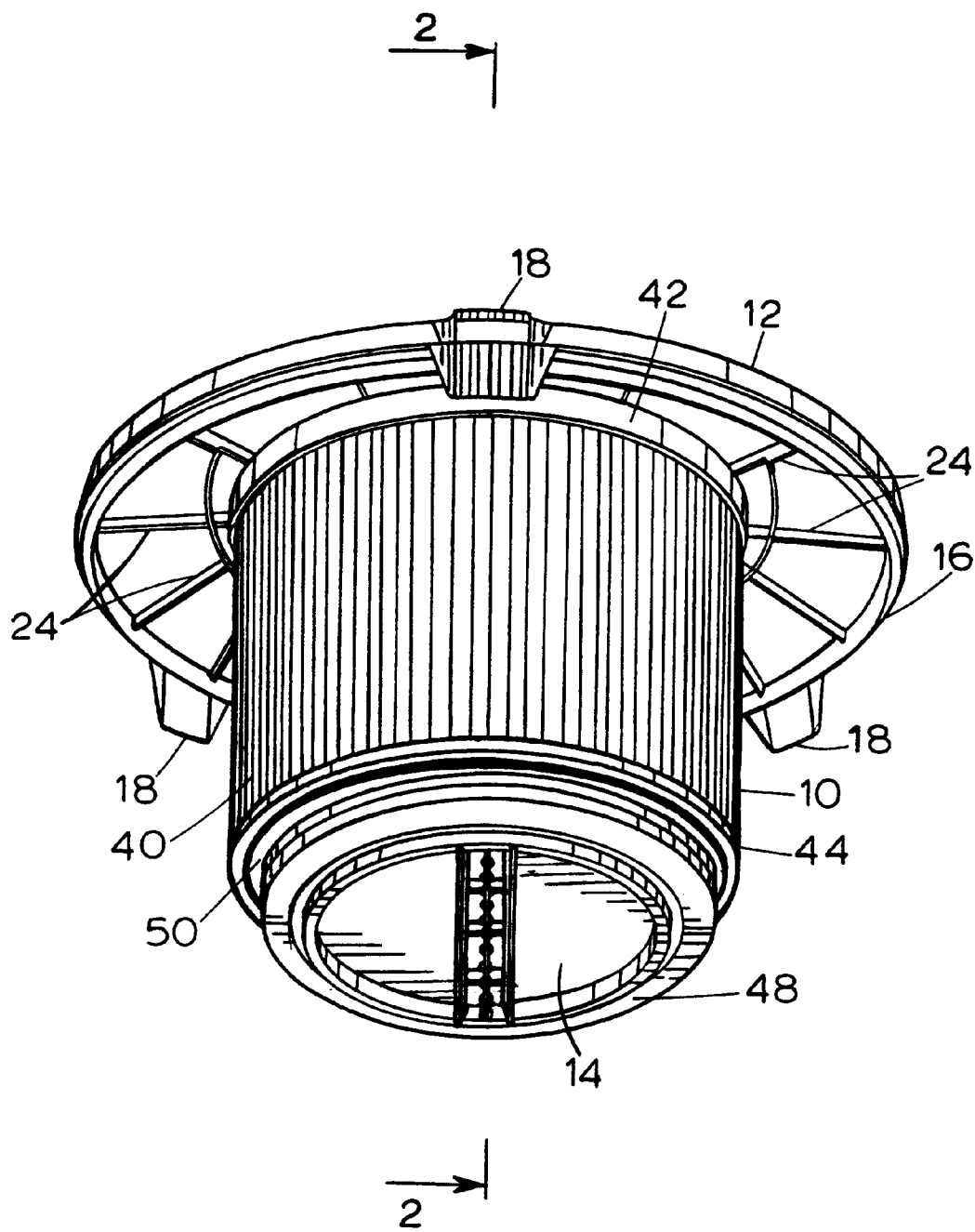
FIG. 1 is a perspective view of a dual filter assembly of the present invention installed on a tank lid of a vacuum cleaner.

Referring initially to FIG. 1, a dual filter assembly 10 is held to a tank lid 12 by a cap 14. Also referring to FIGS. 2 and 3, the tank lid 12 has a rim 16 which is designed to fit over the edge of a tank-type receptacle (not depicted) for a vacuum cleaner. Around the periphery of the tank lid 12 are several latch ports 18 which cooperate with latches (not depicted) on the tank in order to hold the tank lid to the tank. Ordinarily, the tank lid 12 is bolted to a motor housing which contains a motor, air impeller and associated equipment (not depicted). The tank lid 12 has a wall 20 which defines an opening 22 through which air is drawn by the air impeller of the vacuum cleaner. All across the bottom of the tank lid 12 are short support walls 24 which provide strength to the lid.

Attached to the wall 20 of the tank lid 12 are several ribs 26 (FIGS. 2 and 3) which extend downward and are attached to a lower wall 28. Together the ribs 26 and the lower wall 28 define an enclosure or filter cage 30. As best seen in FIG. 3, extending outward from the top of the filter cage 30 is a rim 32 which is interrupted by a plurality of notches 34. Each notch 34 is located adjacent an end of a rib 26.

The tank lid 12 and associated filter cage 30 have been used substantially as shown by the assignee of the present application, Shop Vac Corporation, in a variety of its vacuum cleaners. The notches 34 were previously placed in the rim 32 in order to more easily mold the tank lid 12. The cap 14 and the tank lid 12 may each be made of polypropylene.

Figure 2:
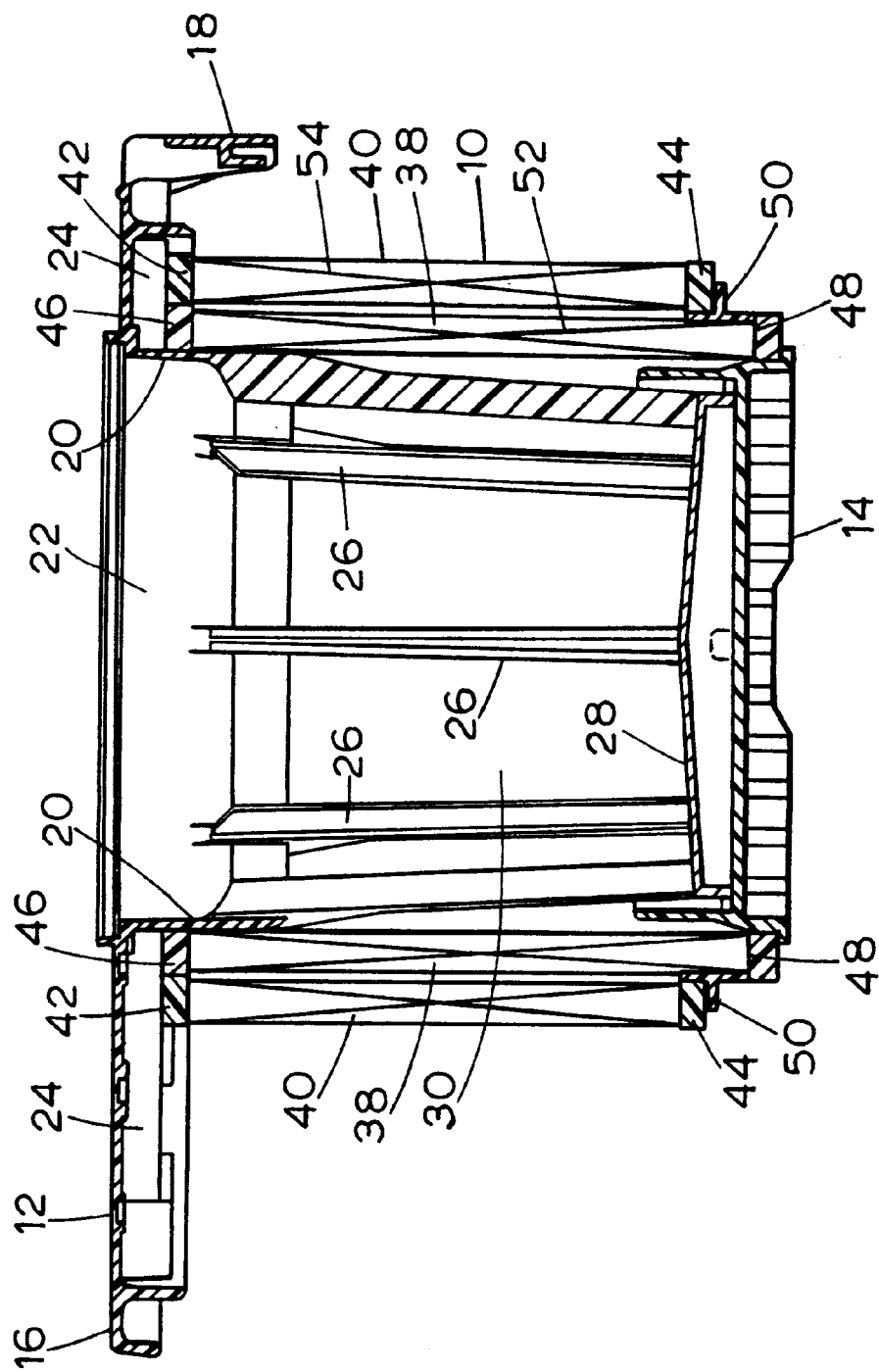
FIG. 2 is a cross-sectional view of the dual filter assembly taken generally along line 2—2 of FIG. 1.
Figure 3:
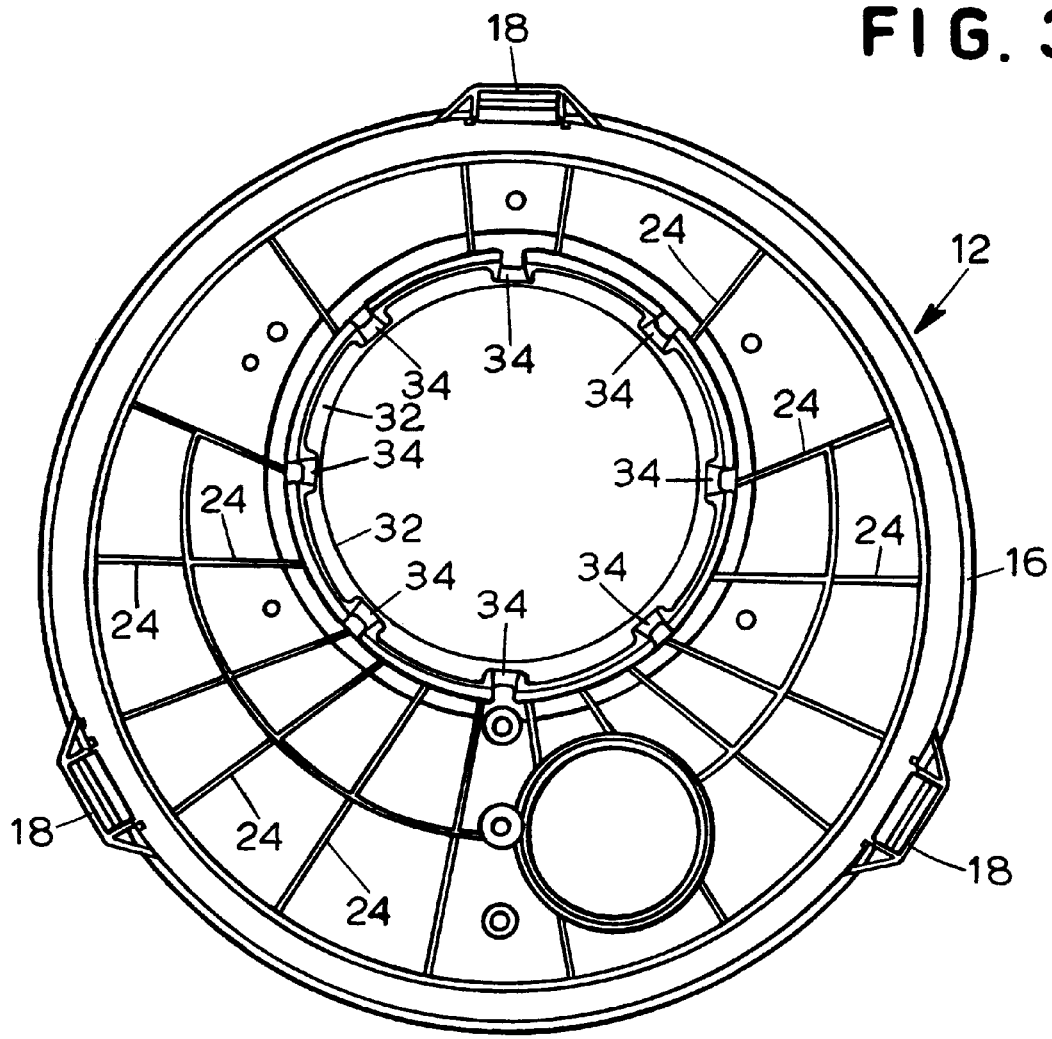
FIG. 3 is a bottom plan view of a tank lid including a filter cage.
Figure 5:
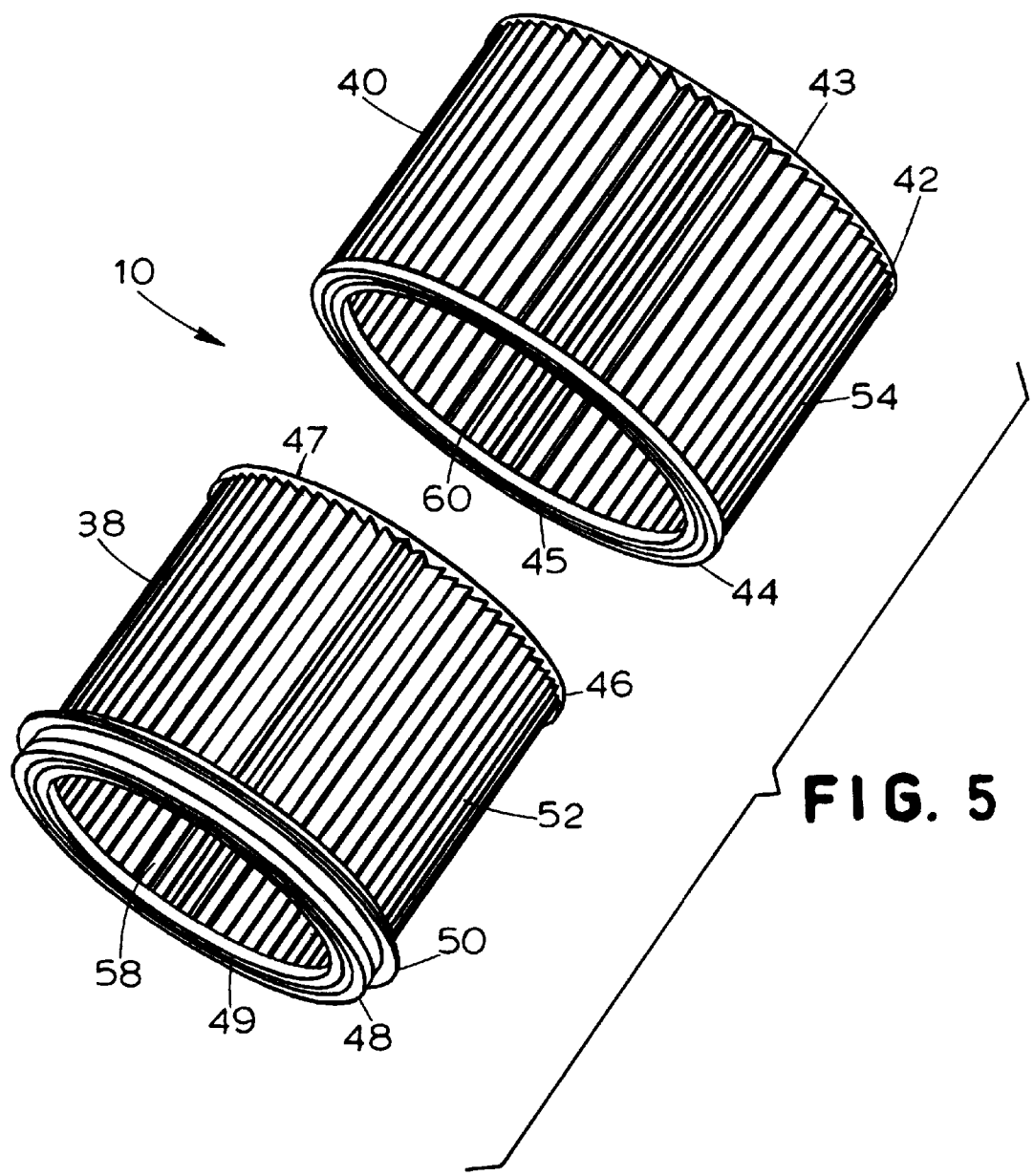
FIG. 5 is an exploded perspective view of the dual filter assembly of FIG. 1.
Figure 6:
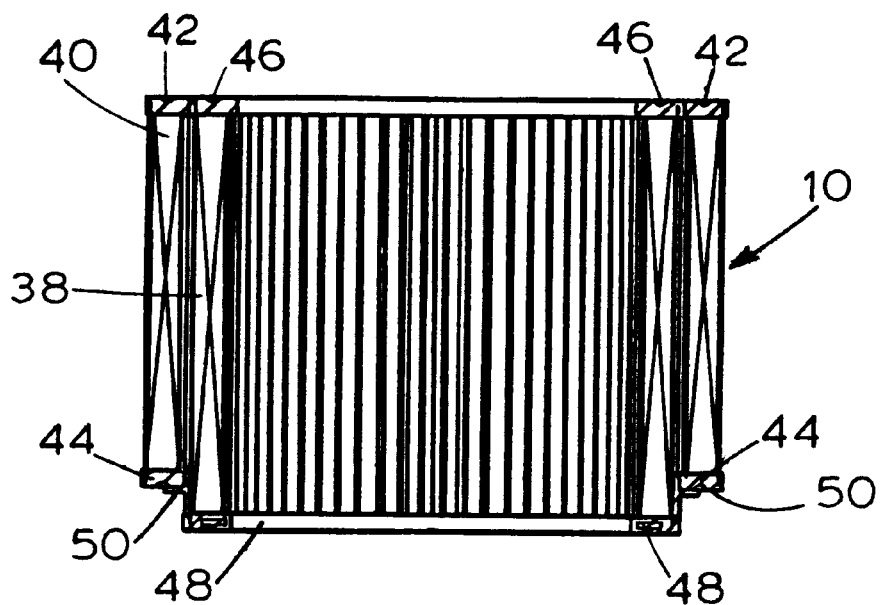
FIG. 6 is a another cross-sectional view of the dual filter assembly taken generally along line 2—2 of FIG. 1, showing the dual filter assembly in isolation.

As shown in FIGS. 2, 5, and 6, the dual filter assembly 10 includes an annular inner filter 38 concentrically arranged inside of an annular outer filter 40. The outer filter 40 includes an upper gasket 42 disposed at an upper end 43 of the filter 40 and a lower gasket 44 disposed at a lower end 45. Likewise, inner filter 38 includes an upper gasket 46 disposed at an upper end 47 of the filter 38 and a lower gasket 48 disposed at a lower end 49. Inner filter 38 has an inner bore 49; outer filter has an inner bore 60. Inner filter 38 also includes a retaining ring 50, which is molded into the lower gasket 48 of the inner filter 38. As shown in FIGS. 2 and 6, inner filter 46 fits on the filter cage 30, and retaining ring 50 supports outer filter 40 when outer filter 40 is installed surrounding inner filter 38.

As shown in FIG. 5, inner filter 38 includes a filter medium 52 and outer filter 40 includes a filter medium 54. The filter media 52, 54 are preferably in a pleated configuration, and may be made from paper, non-woven polyester, or non-woven polypropylene. If non-woven polyester is used, it may comprise melt-blown or spun-bonded polyester, or a combination of melt-blown and spun-bonded polyester. Likewise, if non-woven polypropylene is used, it may comprise melt-blown or spun-bonded polypropylene, or a combination of melt-blown and spun-bonded polypropylene. The filter medium 52 for inner filter 38 preferably comprises a HEPA filter medium.

Figure 7:
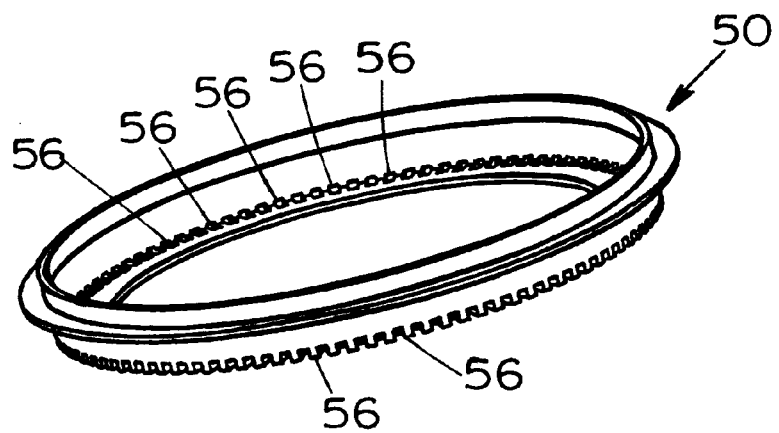
FIG. 7 is a perspective view of the retaining ring of FIG. 1.

Filter gaskets 42, 44, 46, 48 may be formed during assembly of the inner filter 38 and outer filter 40 by molding a polyvinyl chloride ("PVC") type plastisol onto filter media 52, 54. Plastisol, which is commonly used as a potting material for filters, forms an elastomeric material after curing. Other types of plastisols, such as epoxy or polyurethane types, which require two-part mixtures that cure after mixing, may also be used. Retaining ring 50 may be made of metal or of a rigid plastic material, such as polypropylene. As shown in FIG. 7, retaining ring 50 includes a plurality of openings 56 through which plastisol flows when inner filter 38 is assembled. As the plastisol is allowed to cure, retaing ring 50 becomes molded into lower gasket 48 of the inner filter 38. After curing is complete, upper and lower gaskets 46, 48 are firmly attached to filter medium 52 of the inner filter 38. Likewise, upper and lower gaskets 42, 44 become firmly attached to filter medium 54 of the outer filter 40.

To install dual filter assembly 10 in a vacuum cleaner, inner filter 38 is inserted into inner bore 60 of outer filter 40. When completely inserted, lower end 45 and lower gasket 44 of outer filter 40 rest on retaining ring 50. Accordingly, outer filter 40 is supported by the retaining ring 50 when the filter assembly is installed in the vacuum cleaner. Outer filter 40 is preferably symmetrical so that filter assembly 10 fits together equally well if outer filter 40 is reversed in orientation and upper gasket 42 and upper end 43 rest on retaining ring 50 rather than lower gasket 44 and lower end 45. After inner filter 38 is inserted in outer filter 40, filter assembly 10 may be installed on the filter cage 30 of the vacuum cleaner by sliding filter assembly 10 over the filter cage 30. When the filter assembly 10 has been pushed up sufficiently that upper gaskets 42, 46 of filter assembly 10 contact one of the support walls 24 of the tank lid 12, the filter assembly is in place. The upper gasket 46 is then in contact with the wall 20 to form a seal preventing air and dust from passing around the upper gaskets 42, 46, into the lid cage 30, and through the aperture 22.

Figure 4:
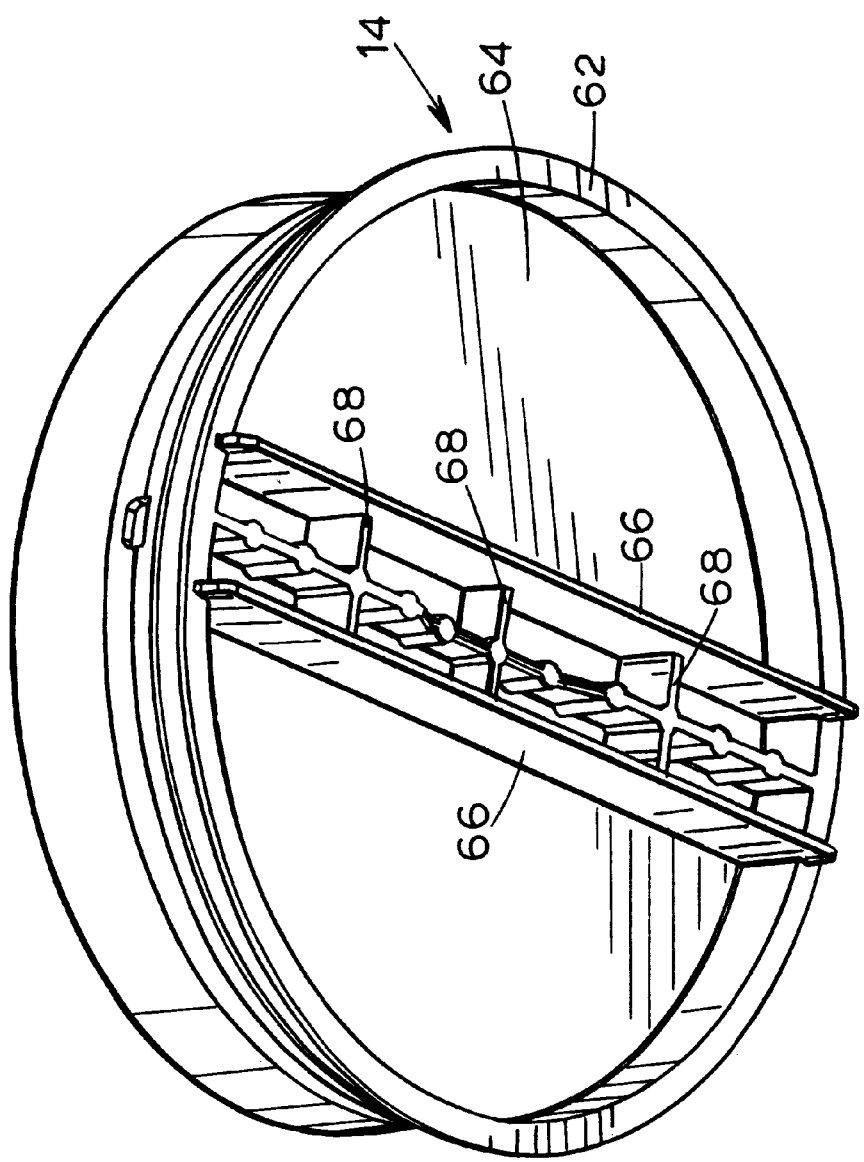
FIG. 4 is a perspective view of the filter retainer cap of FIG. 1.

Once the filter assembly 10 has been fully inserted, the cap 14 is placed adjacent the lower wall 28 of the filter cage 30. As shown in FIG. 4, the cap includes a cylindrical base 62, which is closed near one end by a plate 64. Attached to the plate 64 is a pair of walls 66 which are connected by reinforcing ribs 68. The walls 66 are designed to be gripped by a user for rotation of the cap 14. The cap is designed to form a tight seal with lower gasket 48 of the inner filter 38. Accordingly, when cap 14 is installed air or debris is prevented from being drawn into the filter cage 30 without first passing through filter media 52, 54.

The design of the present invention advantageously allows a combination of two different air filters to be used on a filter cage designed for a conventional cylindrical filter assembly. Thus, no changes to the tank lid 12 and its associated filter cage 30 are necessary to utilize the dual filter assembly 10. Inner filter 38 and outer filter 40 can be separated for inspection and replacement, an improvement over prior designs for dual filter assemblies that do not allow replacement of individual filter elements.

The present invention may be particularly advantageous when a HEPA filter is used as the inner filter. HEPA filters may deteriorate when they become wet, so protection from moisture is desirable. By placing an outer moisture-restricting filter around the inner HEPA filter, the HEPA filter can be protected. When such moisture protection is not needed the outer filter can be easily removed and later replaced, using the present invention.

The foregoing detailed description has been given for clearness of understanding only, and no unnecessary limitations should be understood therefrom, as modifications would be obvious to those skilled in the art.

What is claimed is:

1. A dual filter assembly for a vacuum cleaner comprising:
   an annular inner filter mountable on a filter cage of the vacuum cleaner, the inner filter having a lower end;
   a retaining ring attached to the lower end of the inner filter; and
   an annular outer filter having a lower end, the outer filter removably mounted surrounding the inner filter, the lower end of the outer filter supported by the retaining ring.

2. The filter assembly of claim 1 wherein the retaining ring is molded to the inner filter.

3. The filter assembly of claim 2 wherein the retaining ring is molded to the inner filter by a plastisol material.

4. The filter assembly of claim 2 wherein the retaining ring is molded to a lower gasket of the inner filter.

5. The filter assembly of claim 1 wherein the outer filter comprises a pleated filter medium.

6. The filter assembly of claim 1 wherein the outer filter comprises paper filter medium.

7. The filter assembly of claim 1 wherein the outer filter comprises a non-woven polyester filter medium.

8. The filter assembly of claim 1 wherein the outer filter comprises a non-woven polypropylene filter medium.

9. The filter assembly of claim 1 wherein the inner filter comprises a pleated filter medium.

10. The filter assembly of claim 1 wherein the inner filter comprises paper filter medium.

11. The filter assembly of claim 1 wherein the inner filter comprises a non-woven polyester filter medium.

12. The filter assembly of claim 1 wherein the inner filter comprises a non-woven polypropylene filter medium.

13. The filter assembly of claim 1 wherein the inner filter comprises a HEPA filter medium.

14. The filter assembly of claim 1 further comprising a cap for retaining the filter assembly on the filter cage.

15. A dual filter assembly for a vacuum cleaner comprising:
   an annular inner filter mountable on a filter cage of the vacuum cleaner, the inner filter having a lower end and a HEPA filter medium;
   a retaining ring molded to the lower end of the inner filter by a plastisol material; and
   an annular outer filter having a lower end and a pleated paper filter medium, the outer filter removably mounted surrounding the inner filter, the lower end of the outer filter supported by the retaining ring.

* * * * *